(12) United States Patent
Jenkins

(10) Patent No.: US 11,479,253 B1
(45) Date of Patent: Oct. 25, 2022

(54) MOTORIZED VEHICLE INCORPORATING EXERCISE APPARATUS

(71) Applicant: Matthew E. Jenkins, Gwynedd Valley, PA (US)

(72) Inventor: Matthew E. Jenkins, Gwynedd Valley, PA (US)

(*) Notice: Subject to any disclaimer, the term of this patent is extended or adjusted under 35 U.S.C. 154(b) by 222 days.

(21) Appl. No.: 16/947,297

(22) Filed: Jul. 27, 2020

Related U.S. Application Data

(60) Provisional application No. 62/880,100, filed on Jul. 30, 2019.

(51) Int. Cl.
*B60W 30/188* (2012.01)
*A63B 22/06* (2006.01)

(52) U.S. Cl.
CPC ....... *B60W 30/188* (2013.01); *A63B 22/0605* (2013.01); *A63B 2022/0635* (2013.01); *A63B 2220/12* (2013.01); *A63B 2220/34* (2013.01); *A63B 2220/806* (2013.01); *B60W 2420/42* (2013.01); *B60W 2540/00* (2013.01); *B60W 2556/50* (2020.02); *B60W 2720/10* (2013.01)

(58) Field of Classification Search
CPC .......... B60W 30/188; B60W 2420/42; B60W 2540/00; B60W 2556/50; B60W 2720/10; A63B 22/0605; A63B 2022/0635; A63B 2220/12; A63B 2220/34; A63B 2220/806
See application file for complete search history.

(56) References Cited

U.S. PATENT DOCUMENTS

| | | | | |
|---|---|---|---|---|
| 5,364,271 A * | 11/1994 | Aknin | ................ | A63B 22/0087 434/61 |
| 5,785,669 A * | 7/1998 | Proctor | .............. | A63B 21/4037 601/24 |
| 6,152,250 A * | 11/2000 | Shu-Hsien | ............... | B62M 6/45 180/220 |
| 6,183,403 B1 * | 2/2001 | Dunn | ................. | A63B 21/1609 482/904 |
| 6,920,955 B2 * | 7/2005 | Chamberlin | ............ | B60T 7/042 180/315 |
| 7,641,597 B2 * | 1/2010 | Schmidt | ............. | A63B 21/4001 482/4 |
| 9,505,310 B2 * | 11/2016 | Kronfeld | ............... | B60L 3/0061 |
| 2003/0199362 A1 * | 10/2003 | Chamberlin | ............ | B60T 7/042 482/8 |
| 2012/0053804 A1 * | 3/2012 | Saida | ........................ | B60L 7/10 701/70 |
| 2014/0353055 A1 * | 12/2014 | Kronfeld | ................. | B62M 6/40 701/22 |
| 2019/0070462 A1 * | 3/2019 | Wicks | .................. | A63B 21/022 |

FOREIGN PATENT DOCUMENTS

| | | | | |
|---|---|---|---|---|
| DE | 102013209854 A1 * | 11/2014 | ......... | A63B 21/0054 |
| WO | WO-03072387 A2 * | 9/2003 | ......... | A63B 22/0056 |
| WO | WO-2019073383 A1 * | 4/2019 | ........... | A63B 21/225 |

* cited by examiner

*Primary Examiner* — Babar Sarwar

(57) ABSTRACT

An automobile including an exercise apparatus for use by the driver while driving is described. The apparatus may integrate the user's exercise performance into control of the vehicle's speed, acceleration and braking.

13 Claims, 2 Drawing Sheets

MOTORIZED VEHICLE INCORPORATING EXERCISE APPARATUS

CROSS REFERENCE TO RELATED APPLICATION

This application claims priority to provisional application Ser. No. 62/880,100 filed on Jul. 30, 2019 and titled Motorized Vehicle Incorporating Exercise Apparatus, and which is incorporated in its entirety by reference herein.

BACKGROUND

The automobile has long been a staple of daily life. While it provides comfort and easy access to remote locations in all weather conditions, time spent commuting behind a steering wheel is largely time taken from other activities. One activity most individuals could use more of is exercise. The demands of a working schedule and fatigue at the end of a workday rob many of the opportunity to exercise. Twenty-first century vehicles now provide features that make exercise while driving a possibility. Features such as drive by wire and autonomous driving allow the driver to use an exercise device safely and offer the possibility of engaging the driver's exercise level with the vehicle's motion control.

DETAILED DESCRIPTION OF PREFERRED EMBODIMENTS

Those skilled in the art will recognize other detailed designs and methods that can be developed employing the teachings of the present invention. The examples provided here are illustrative and do not limit the scope of the invention, which is defined by the attached claims.

The following detailed description refers to the accompanying drawings. The same reference numbers in different drawings may identify the same or similar elements.

Figure 1:
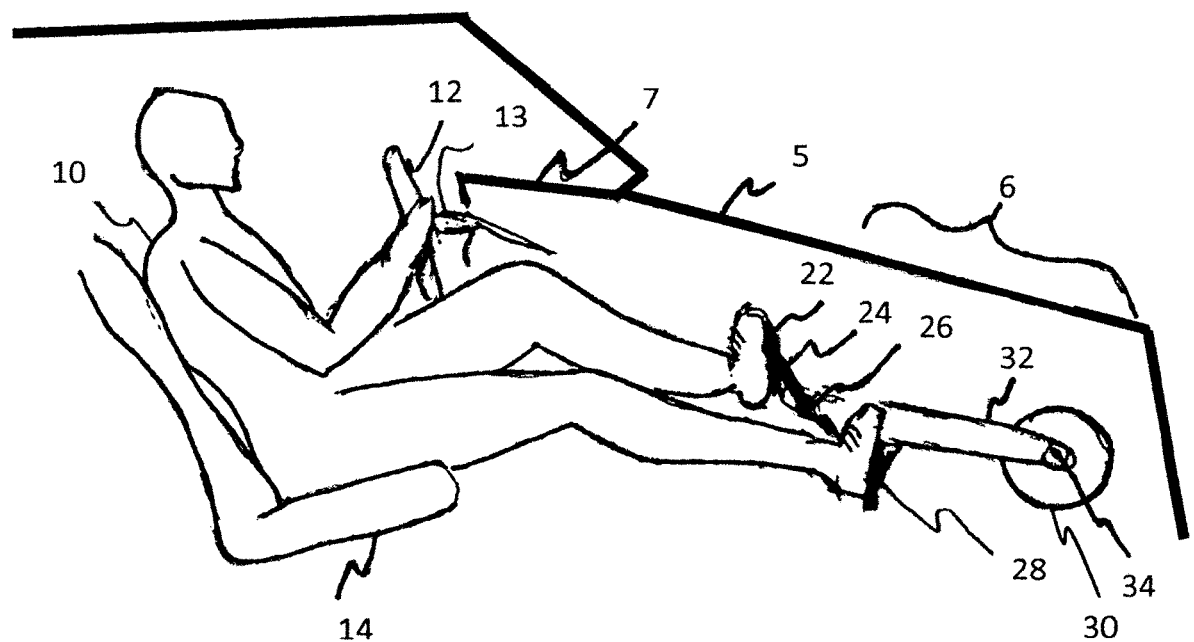
FIG. 1 is a block diagram of an exemplary automobile incorporating a pedal exercise apparatus.

FIG. 1 is a diagram of an exemplary automobile 5 with an exercise device included for use by the driver 10. The automobile may include a conventional seat 14 and steering wheel 12 as shown. Instead of conventional accelerator and brake pedals, however, the inventive apparatus in an embodiment includes a pair of rotating pedals 22, 28 mounted on crank arms 24, 25 about a crank hub 26. The crank hub 26 may include a first gear (not shown) connected to a chain 32, which chain 32 is connected to a flywheel 30 by a second gear 34. The flywheel is a known means for providing rotational inertial that simulates the motion of an actual bicycle for the rider. The crank arms are arranged under the dashboard 7 to allow the driver to pedal the apparatus while driving. In an embodiment, the automobile 5 comprises electric motor drive and does not have an internal combustion engine in the forward compartment 6, thus providing space for the aforementioned flywheel 30 and chain 32 and associated mounting hardware for the flywheel 30. While the flywheel 30 is shown in FIG. 1 mounted in a vertical position, the flywheel may alternatively be mounted in a horizontal position to save space under the forward compartment. In this case, known means for transferring the motion of the cranks 24 to the horizontally mounted flywheel may be used. These can include using a crankshaft and bevel gears instead of a chain, or using a belt drive, which may include idlers to direct the belt from a first axis at the crank hub to a second axis at the horizontally-mounted flywheel.

Recognizing that a flywheel is a heavy component that must be securely mounted to protect the driver and passengers in the event of a crash, alternative means for providing rotational inertia back to the crank arms 24 and pedals 22, 28 may include a sealed water chamber with paddles driven by the pedals. The water is urged by the paddles in a rotating motion by the paddles, thus providing rotational inertia back to the driver. An advantage of the sealed water chamber over the flywheel is that the water chamber can be constructed to split open on impact so that the inertial mass is not directed at the driver, unlike the flywheel, which must be securely mounted to avoid the driver on impact. Antifreeze may be used in the water chamber in regions where the automobile will experience freezing temperatures.

The crank arms 24, flywheel 30 or water paddles (not shown) may be connected to an electrical generator so that the driver's exercise aids in charging the automobile's batteries in the case where the automobile incorporates an electrically driven propulsion system. Power generated by the user may be indicated on a vehicle display or stored for later download by the user.

Driver control of braking and acceleration: The crank arms 24 may be arranged to stop rotating, or be locked by the vehicle system controller, at which point and the pedals 22, 28 may then be used as conventional brake and accelerator pedals. The pedals may include sensors to indicate the angle of rotation with respect to the crank arms 24. The sensors may be connected to the vehicle control system to convey breaking and acceleration information. In an alternative embodiment, the steering wheel or the steering wheel column 13 may include break and accelerator controls. Such controls are already commonplace on automobiles equipped with cruise control. The steering wheel 12 may be augmented with a second circular grab bar behind the main wheel to allow the user to quickly actuate the brakes regardless of the user's hand position on the steering wheel 12.

In an alternative embodiment, the automobile 5, may include a handlebar-type steering device instead of a conventional steering wheel 12. Handlebars are well-suited to the cycling experience and may include braking and acceleration controls such as those found on motorcycles. Thus, the pedals 22, 28 do not need to include means for conversion from exercise mode to brake and accelerator mode as described above. The handlebar, brake and acceleration controls may connected to position sensors and may also include feedback actuators so that the driver senses motion and resistance found in conventional controls. Such drive-by-wire controls, first introduced in aircraft control, are well known in the art.

Figure 2:
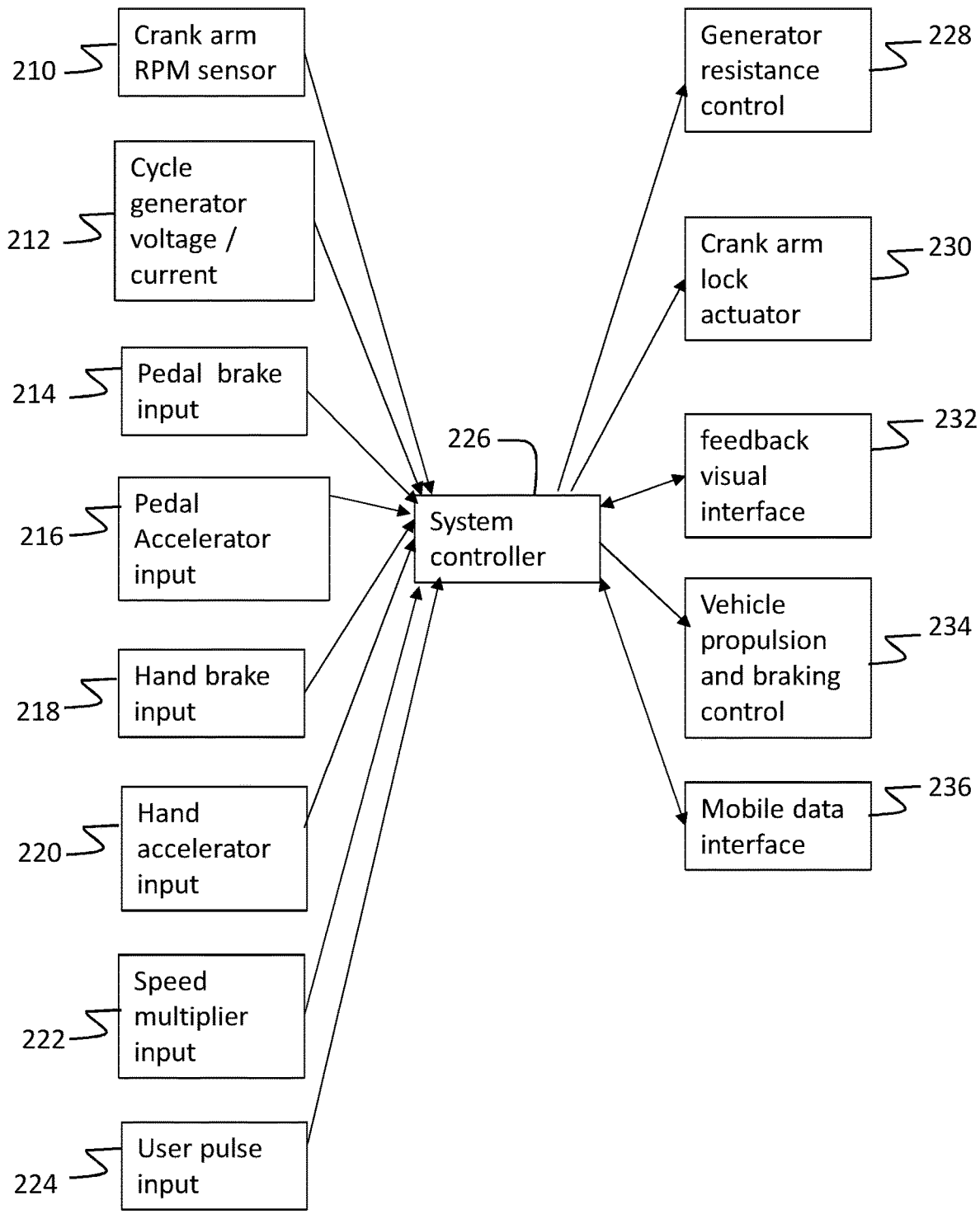
FIG. 2 is a flow diagram of an exemplary control system for the automobile of FIG. 1.

FIG. 2 is a block diagram of an exemplary control system for a vehicle comprising an exercise device. The system includes a system controller 226, which may be a single vehicle control computer or a distributed control comprising multiple controllers. Thy system controller may be a standard electric vehicle controller modified to include inputs, outputs and software to control an exercise device. FIG. 2 does not show all of the components of a vehicle controller, only exemplary components added to integrate an exercise device into the vehicle controls. The system may include a crank arm 24 RPM sensor 210, a cycle generator voltage and current input 212, a pedal actuated brake input 214, a pedal actuated accelerator input 216, a hand actuated brake input 218, a hand actuated accelerator input 220, a speed multiplier input 222 configured to allow the user associate pedaling speed with vehicle speed and a user pulse rate input 224, which may be used, for example to track user exercise performance, but which may have no effect on the vehicle control. The system may also include a cycle generator resistance control 228 configured to allow the system controller to set the amount of resistance the user feels while pedaling. The system may also include a crank arm lock actuator 230 configured to lock the crank arms 24 in a drive only/no exercise position. The system may also include a visual user feedback interface 232, which may be separate from other vehicle user interfaces or may be included in a comprehensive vehicle user interface. The system may also include vehicle propulsion and braking controls 234 that may be selectably integrated by the system controller into the exercise experience. The system may also include a mobile data interface 236, which may be an interface to a portable mobile device the user has or a cellular or other wireless network interface that is included in the vehicle's electronics.

The inclusion of an exercise apparatus in an automobile provides further advantages beyond allowing the driver to recapture lost time driving by exercising. The exercise experience can be enhanced by connecting the driver's exercise performance to control of the vehicle and/or by connecting the terrain traversed by the vehicle to resistance transferred to the driver's pedals. Presentation of simulated roadway and terrain conditions to the user in stationary exercise devices is known and is a popular means for motivating the user in the exercise experience. By connecting real-world conditions to the driver, the inventive apparatus provides an unparalleled experience than cannot be attained on a stationary exercise device or even on an actual bicycle. The automobile-mounted exercise apparatus allows the user to experience actual roadway conditions in the safety and comfort of an automobile.

In an embodiment, the apparatus may connect the driver's exercise performance and experience to the motion of the vehicle. Speed of the user's pedal motion may be sensed and communicated to the vehicle controls to accelerate, slow or coast the vehicle. Conversely, roadway terrain may be transmitted back to the user in the form of added or reduced resistance to rotation of the pedals 22, 28. An electrical generator connected to the pedals, such as referred to above, can also provide various levels of resistance. When the vehicle traverses hills, the apparatus can be arranged to increase or decrease (as appropriate) the resistance at the pedals. The driver can chose to enable or disable this feature, or to limit the association between the resistance included and the actual terrain.

The automobile may include autonomous driving features that relieve the driver of the need to focus on road conditions, navigation and hazards and instead allow the driver to focus on exercising for some or all of the trip. Autonomous driving features may also be incorporated into the exercise experience. For example, the aforementioned association between terrain and pedal resistance can be saved for repeated routes, so that, for example, a driver may choose to only connect pedal resistance to terrain for certain portions of a trip or to limit the connection effect at different levels for various portions of the trip. The connection may also be automatically suspended to allow the driver to freewheel under certain conditions. For example, if the driver receives a phone call and does not want to be overexerted during the call, the terrain-resistance connection can be set to automatically suspend for a call, the approach of an emergency vehicle or driver-initiated maneuvers requiring additional attention such as passing another vehicle or lane-changed for road-work.

In a further embodiment the seat 14 is ventilated with extra vents near head and neck. In a further embodiment the vehicle includes drive by wire, speed-sensitive steering. In a further embodiment, the vehicle includes a drive lever on right of the steering column 13 similar to the Tesla S/X® for forward/reverse/neutral, but with additional forward/backwards pull to switch between the previously-described exercise and vehicle control modes on the pedals. In a further embodiment the vehicle includes levers on the left side of the steering column similar to those in a Tesla S/X®—Turn signals, and autodrive lever. In a further embodiment the vehicle includes a rolling toggle to switch a drive multiplier on the middle of steering wheel/handlebars between 1× and 50× pedaling speed from pedals/output. In a further embodiment, reverse pedaling will initiate braking as in the motion associated with coaster brake bicycles.

In a further embodiment, the rotary motion of the crank arm 24 is replaced with an elliptical drive configured to enable pedal motion in an elliptical pattern. In a further embodiment the rotary motion of the crank arm 24 is replaced with a push-pull drive configured to limit motion of the pedals 24, 28 to a single plane while exercising.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A vehicle for highway use comprising:
    a driver-side exercise apparatus configured to enable a driver to exercise while driving, said exercise apparatus having a foot actuated exercise device having left and right pedals, and
    a vehicle interface configured to integrate driver actuation of said foot actuated exercise device with control of the vehicle,
    wherein said exercise apparatus includes crank arms attached to said left and right pedals and to a hub and configured to impart a circular rotary motion to the driver's feet while exercising, and
    wherein said crank arms are attached to a wheel configured to provide rotational inertia to said crank arms.

2. The vehicle of claim 1, further comprising a vehicle controller and wherein said left pedal includes a sensor configured to provide a brake input to said vehicle controller and said right pedal includes a sensor configured to provide an accelerator input to said vehicle controller.

3. The vehicle of claim 1, further comprising a steering handlebar, said steering handlebar connected to a sensor arranged to provide a steering input of handlebar position to a vehicle controller, said steering handlebar further comprising a manual accelerator interface and a manual brake interface, configure to provide acceleration and braking inputs respectively to said vehicle controller.

4. A vehicle for highway use comprising:
   a driver-side exercise apparatus configured to enable a driver to exercise while driving, said exercise apparatus having a foot actuated exercise device having left and right pedals, and
   a vehicle interface configured to integrate driver actuation of said foot actuated exercise device with control of the vehicle,
   wherein said exercise apparatus includes crank arms attached to said left and right pedals and to a hub and configured to impart a circular rotary motion to the driver's feet while exercising, and
   an electrical generator connected to said crank arms and configured to be controlled to provide user-selectable levels of resistance to the user while exercising.

5. The vehicle of claim 4, wherein said exercise apparatus further comprises a pedal rotational speed sensor and a vehicle controller, wherein said vehicle controller is configured to set vehicle speed based at least in part on an input from said pedal rotational speed sensor.

6. The vehicle of claim 5, further comprising a global positioning system (GPS) receiver and a map database configured to determine and transmit to said vehicle controller vehicle location and roadway terrain and wherein said vehicle controller is configured to adjust said user-selectable levels of resistance based on said roadway terrain.

7. The vehicle of claim 6, wherein said vehicle controller is configured to store said user-selected level of resistance and to store in a memory and associate said user-selected level of resistance with said vehicle location and wherein said vehicle controller is further configured to set said level of resistance on a subsequent trip based on said associated user-selected level of resistance and vehicle location.

8. The vehicle of claim 7, further comprising a camera, said camera being configured to film footage of roadway traversed by the vehicle and said vehicle controller being configured to store and associate user performance with said stored filmed footage for upload to a user computing device.

9. A vehicle for highway use comprising:
   a driver-side exercise apparatus configured to enable a driver to exercise while driving, said exercise apparatus having a foot actuated exercise device having left and right pedals, and
   a vehicle interface configured to integrate driver actuation of said foot actuated exercise device with control of the vehicle,
   wherein said exercise apparatus includes crank arms attached to said left and right pedals connected by secondary arms to a hub and configured to impart an elliptical rotary motion to the driver's feet while exercising, and
   an electrical generator connected to said crank arms and configured to be controlled to provide user-selectable levels of resistance to the user while exercising.

10. The vehicle of claim 9, wherein said exercise apparatus further comprises a pedal rotational speed sensor and a vehicle controller, wherein said vehicle controller is configured to set vehicle speed based at least in part on an input from said pedal rotational speed sensor.

11. The vehicle of claim 10, further comprising a global positioning system (GPS) receiver and a map database configured to determine and transmit to said vehicle controller vehicle location and roadway terrain and wherein said vehicle controller is configured to adjust said user-selectable levels of resistance based on said roadway terrain.

12. The vehicle of claim 11, wherein said vehicle controller is configured to store said user-selected level of resistance and to store in a memory and associate said user-selected level of resistance with said vehicle location and wherein said vehicle controller is further configured to set said level of resistance on a subsequent trip based on said associated user-selected level of resistance and vehicle location.

13. The vehicle of claim 12, further comprising a camera, said camera being configured to film footage of roadway traversed by the vehicle and said vehicle controller being configured to store and associate user performance with said stored filmed footage for upload to a user computing device.

* * * * *